US012396579B2

(12) United States Patent
Ali

(10) Patent No.: US 12,396,579 B2
(45) Date of Patent: Aug. 26, 2025

(54) TRAVEL NECK PILLOW WITH ATTACHED BLANKET AND LIGHTS

(71) Applicant: Syedalvi Tariq Ali, Wyckoff, NJ (US)

(72) Inventor: Syedalvi Tariq Ali, Wyckoff, NJ (US)

( * ) Notice: Subject to any disclaimer, the term of this patent is extended or adjusted under 35 U.S.C. 154(b) by 0 days.

(21) Appl. No.: 17/320,839

(22) Filed: May 14, 2021

(65) Prior Publication Data

US 2021/0353083 A1 Nov. 18, 2021

Related U.S. Application Data

(60) Provisional application No. 63/024,580, filed on May 14, 2020.

(51) Int. Cl.

*A47G 9/10* (2006.01)
*A47G 9/02* (2006.01)
*F21V 33/00* (2006.01)

(52) U.S. Cl.

CPC ......... *A47G 9/1045* (2013.01); *A47G 9/1081* (2013.01); *A47G 9/0223* (2013.01); *A47G 2009/1018* (2013.01); *F21V 33/0024* (2013.01)

(58) Field of Classification Search

CPC ...... A47G 9/10; A47G 9/1045; A47G 9/1063; A47G 9/1072; A47G 9/1081; A47G 9/0223; A47G 2009/1018; F21V 33/0024

See application file for complete search history.

(56) References Cited

U.S. PATENT DOCUMENTS 5,385,500 A * 1/1995 Schmidt .................. F21V 21/32 446/485
6,814,709 B2 * 11/2004 Schwartz ............... A47C 7/725 5/633
D590,198 S * 4/2009 Nostrant ........................ D6/601
7,513,001 B1 * 4/2009 Leach .................. A47G 9/1045 5/655
10,292,508 B1 * 5/2019 Kim ..................... A47G 9/1081
11,419,441 B2 * 8/2022 Waldeier .............. A47G 9/1045
2006/0176680 A1 * 8/2006 Bretz ...................... F21V 21/32 362/108
2007/0253591 A1 * 11/2007 Popilek ................. A61M 21/00 381/301
2007/0256692 A1 * 11/2007 Pearson ................. A47C 7/383 128/845
2009/0133192 A1 * 5/2009 Hassell .................. A47C 7/383 5/639
2010/0139001 A1 * 6/2010 Mangano ............. A47G 9/1045 297/229
2015/0208812 A1 * 7/2015 Fenton ................... A47C 20/02 5/632

(Continued)

*Primary Examiner* — George Sun

(74) *Attorney, Agent, or Firm* — Olav M. Underdal; IDP Patent Services

(57) ABSTRACT

The present disclosure provides a travel pillow including a back section and two arm sections each including a filler material, the back section comprising a pouch comprising a blanket attachable to the pillow and configured to fit in the pouch, the arm sections each range in length from about 8 inches to about 15 inches and are approximately the same length, the back section ranges in length from about 6 inches to about 12 inches, the arm sections and back section have a thickness ranging from 3 inches to 12 inches and the blanket includes a semispherical, hemispherical, and/or oval opening sufficient for accommodating a user's head.

13 Claims, 6 Drawing Sheets

(56) References Cited

U.S. PATENT DOCUMENTS

| | | | | |
|---|---|---|---|---|
| 2015/0366382 | A1* | 12/2015 | Ostolaza-Torres | A44B 17/00<br>5/485 |
| 2017/0086606 | A1* | 3/2017 | Kassab Arabo | A47G 9/109 |
| 2017/0258154 | A1* | 9/2017 | Peyser | A45F 3/00 |
| 2018/0064269 | A1* | 3/2018 | Carlile | A47G 9/0223 |
| 2020/0077820 | A1* | 3/2020 | Lowry | A47G 9/1027 |
| 2020/0109841 | A1* | 4/2020 | Cacciabeve | F21L 4/04 |
| 2020/0128980 | A1* | 4/2020 | Hanifi | A47G 9/1081 |
| 2020/0253397 | A1* | 8/2020 | Diaz | A47G 9/1081 |
| 2020/0408389 | A1* | 12/2020 | Cacciabeve | F21V 21/32 |
| 2021/0127867 | A1* | 5/2021 | Lee | A47C 7/383 |

* cited by examiner

TRAVEL NECK PILLOW WITH ATTACHED BLANKET AND LIGHTS

CROSS REFERENCE TO RELATED APPLICATIONS

This application claims priority to U.S. Provisional Application No. 63/024,580 filed on May 14, 2020 which is herein incorporated by reference in its entirety.

BACKGROUND OF THE DISCLOSURE

Field of the Invention

This disclosure is generally directed to travel pillows.

Description of the Related Art

In recent years, travel has changed, and more specifically air travel, due to various restrictions on the size and weight of luggage that can be carried on board an aircraft. Carrying the extra weight of a blanket in carry-on luggage may cost a traveler additional fees due to the extra weight carried. Furthermore, many flights do not provide blankets for a traveler, and in some cases even if they are available, a particular traveler may not be able to obtain one for a variety of reasons. For example, there may be an insufficient number for the number of travelers who desire one.

Accordingly, better designed carry-on items including travel pillows with attached blankets would be beneficial to modern travelers facing limited space for carry-on items and baggage weight restrictions.

SUMMARY OF THE INVENTION

The present disclosure provides a travel pillow including a cover and a back section and two arm sections each including a filler material, the back section including a pouch including a blanket attachable to the pillow and configured to fit in the pouch, the arm sections each range in length from about 8 inches to about 15 inches and are approximately the same length, the back section ranges in length from about 6 inches to about 12 inches, the arm sections and back section have a thickness ranging from about 3 inches to about 12 inches and the blanket includes a semispherical, hemispherical, and/or oval opening sufficient for accommodating a user's head.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
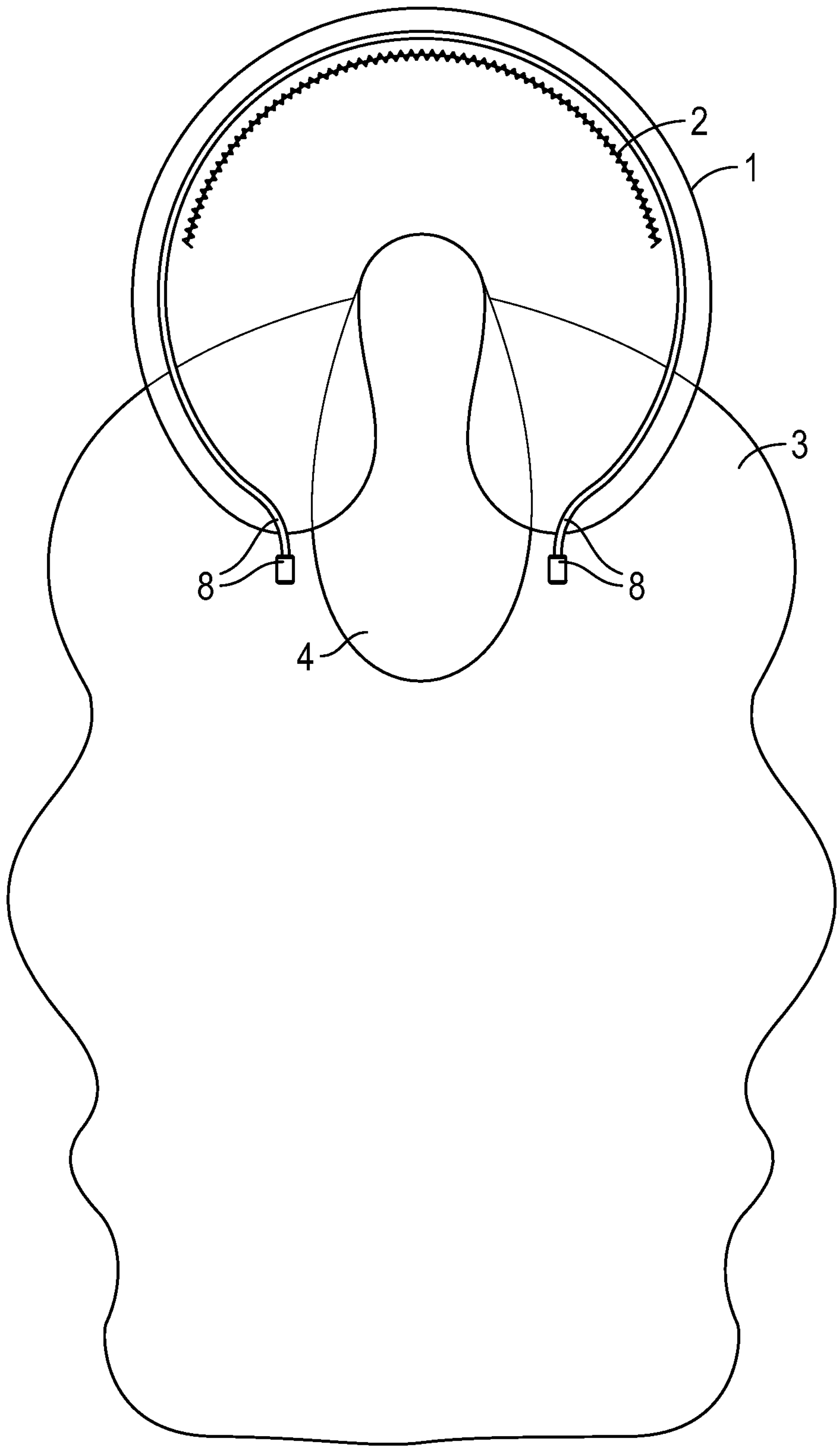
FIG. 1 shows a travel pillow and blanket of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The disclosed travel pillow with blanket comprises a pillow cover; a blanket pouch; and a blanket. In embodiments, the travel pillow also includes a reading light and usb port.

A pillow cover is a main covering over the foam of a pillow and can include a zipper preferably on the posterior or superior, or upper side of the pillow cover which will allow the pillow cover to be removed from the pillow.

A blanket pouch may be attached on the top of the pillow cover on the posterior/lateral side of the cover. The pouch may attach adjacent to an upper pillow cover zipper which will allow the pouch to be closed. There may be a second lower or inferior/posterior zipper disposed at or near the base of the pillow (near the neck area). The pouch will hold a blanket inside and along the entire posterior/lateral aspect of the pillow. The lower zipper will provide a means for attaching the blanket. The lower zipper may allow access and removal of the blanket.

As mentioned, a blanket inside the pouch can be attached at or near the base of the pillow along the neckline with the lower zipper. The lower zipper may allow the blanket to release from the pouch. The blanket may also have a head sized opening, for example, which may be oval or round near the pouch opening or lower zipper. The opening may be used for head insertion before placing the pillow around the neck with the blanket attached.

Another feature of the travel pillow is a reading light. The reading light may be an LED light. The reading light may be attached to a band and have left and right arms. This novel feature may have soft light bulbs on the anterior tips of both arms and have touch buttons for light control. The touch buttons may be located, for example, near the LED lights at the end of each arm. The touch buttons may also be located at any other convenient position.

The light device may also have a charger for charging the device. The charger may be a USB charger. The USB charger may be located at the mid-posterior portion of the light device in one example. Other convenient locations may be used as well. The reading light device may be removable from the travel pillow.

The pillow cover may also be removable along with the attached blanket and pouch. In embodiments, the pillow cover may include a generally semispherical, hemispherical, oval, or the like opening at one end to accommodate a user's head. Thus, in embodiments, the cover may remain attached to the pillow, fit around the user's head, and cover the user when in use.

The reading light device may permit a traveler to read while traveling, for example, during a flight, train trip, or bus trip. The neck pillow and reading light may also be used at home or in the car or while camping. The pillow and attached blanket may also be used when resting at, for example, an airport transit lounge, on the beach, or could also be used by a nursing mother while nursing a baby in any public areas like airport, plane, train, buses, parks and even at home without an invasion of privacy.

The pillow may include any sort or foam material typically used for pillows and preferably includes memory foam, and more preferably 100% memory foam, with preferably machine washable super soft, magnetic therapy, cloth. The pouch may also be made of soft, solid, or mesh material cloth. The blanket may be made of all-weather, extra soft, fluffy, fibers. The cover, pillow, pouch, blanket, and light may also be generally made of any suitable materials commonly used in the art of travel pillows, blankets, and reading lights. The reading light is preferably an LED light.

FIG. 1 shows a top-down view of travel pillow and blanket of the disclosure. FIG. 1 shows pillow with cover 1, pouch zipper 2, and blanket 3 with an opening 4 for a user's head. FIG. 1 further shows reading lights 8 attached to the pillow.

Figure 2:
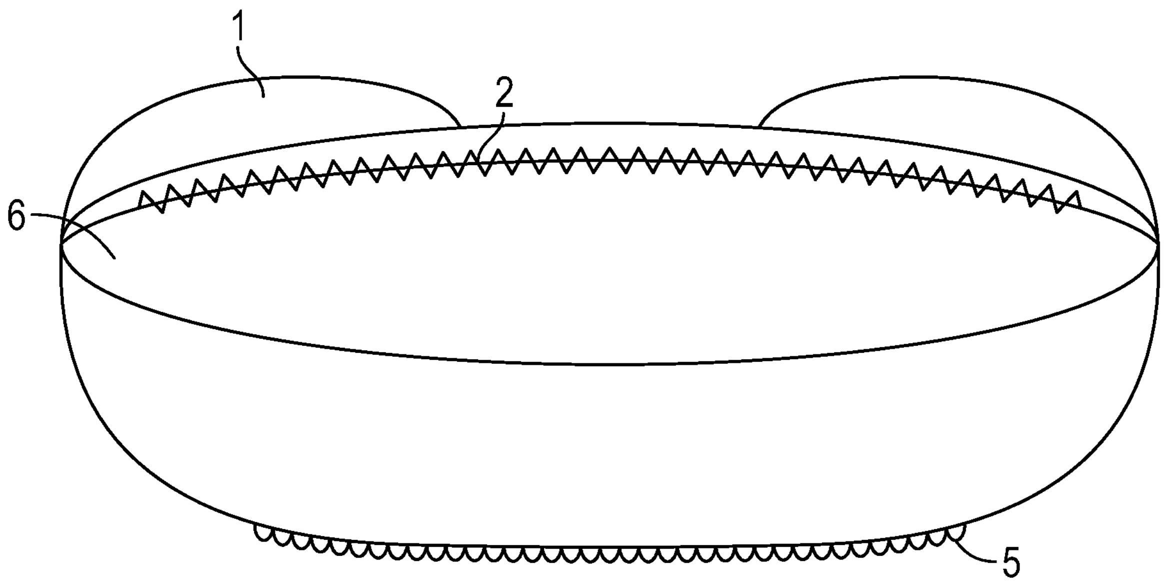
FIG. 2 shows a rear view of a travel pillow with blanket of the disclosure.

FIG. 2 shows a rear view of a travel pillow with cover and blanket of the disclosure. FIG. 2 shows travel pillow with cover 1, upper zipper 2 (for a pouch) and lower zipper 5 (for a blanket) along with pouch 6 for holding a blanket. In embodiments, pouch 6 may have an associated pouch flap (not shown). As shown in FIG. 2, the attached blanket may be stored in the pouch in the back of the travel pillow when not in use. The top zipper opens up pouch 6 for blanket storage. The bottom zipper is a blanket zipper and may attach the blanket to the pillow. As shown in FIG. 1, when in use blanket may remain attached to the pillow and the user can insert their head through a hole in the pillow allowing the blanket to cover the user and remain attached to the pillow.

Figure 3:
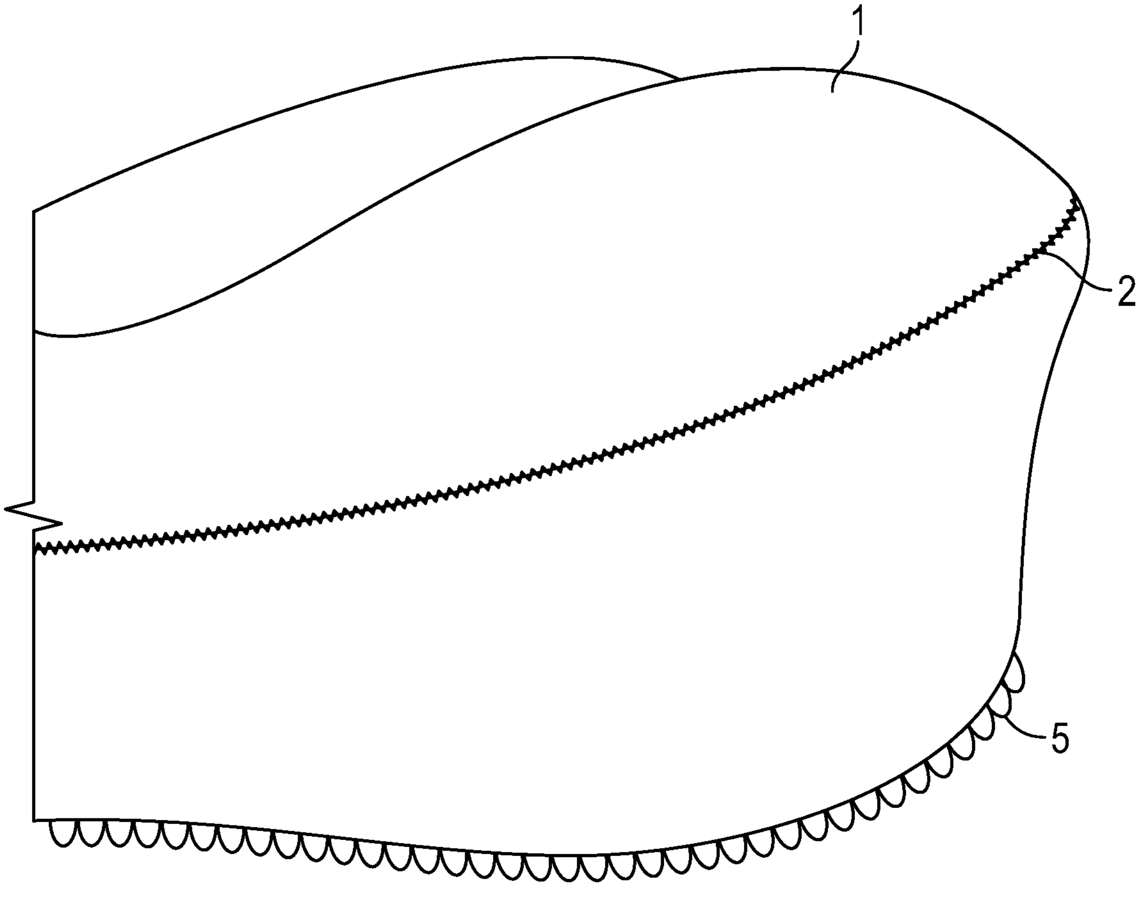
FIG. 3 shows another rear-view embodiment of travel pillow of the disclosure.

FIG. 3 shows another rear-view embodiment of travel pillow of the disclosure. FIG. 3 shows travel pillow 1, upper pouch zipper 2, and lower blanket zipper 5.

Figure 4:
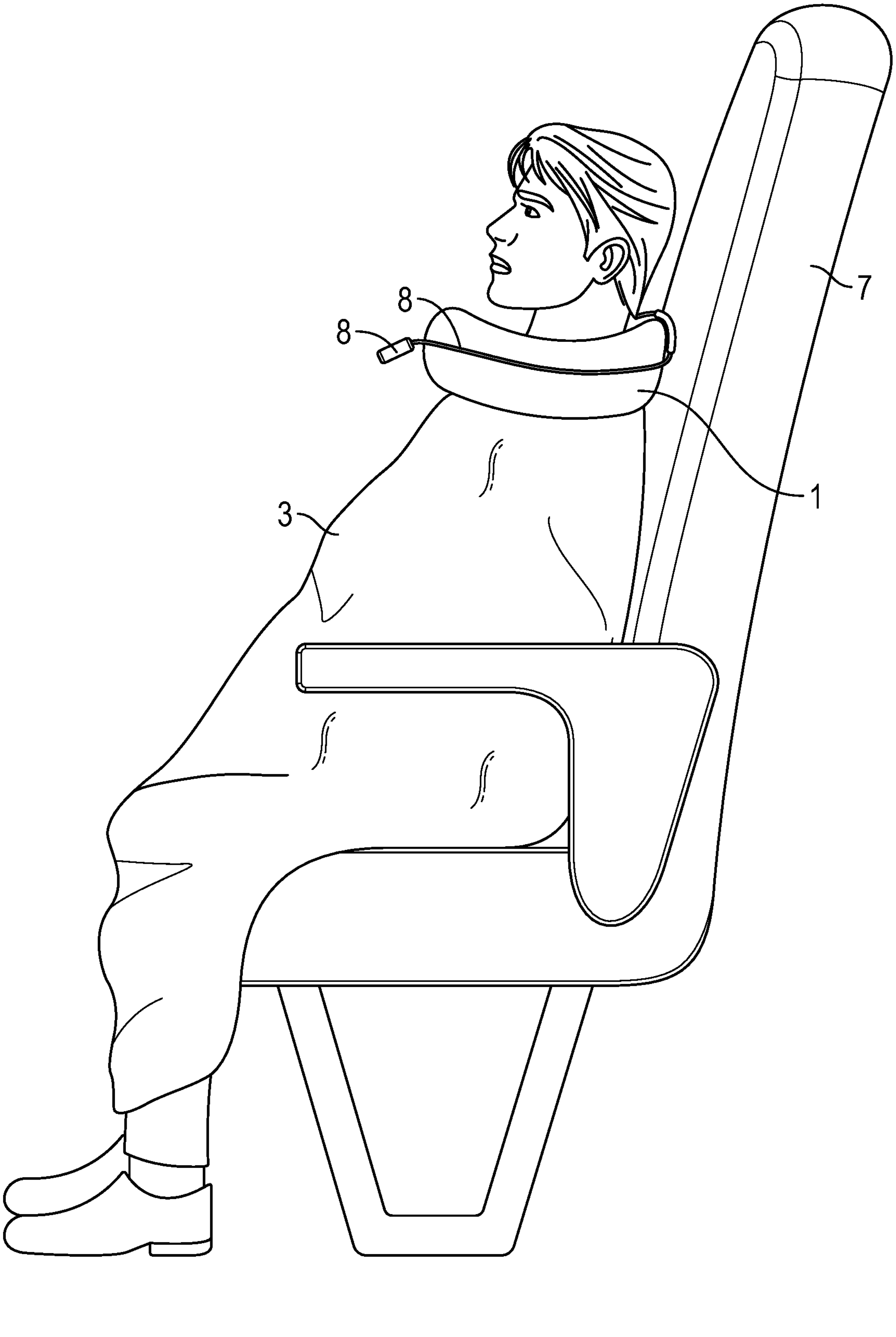
FIG. 4 shows another embodiment of a travel pillow with blanket of the disclosure.

FIG. 4 shows another embodiment of the travel pillow with blanket of the disclosure. FIG. 4 shows a user sitting in seat 7 with travel pillow 1 with reading light and band 8, and attached blanket 3.

Figure 5:
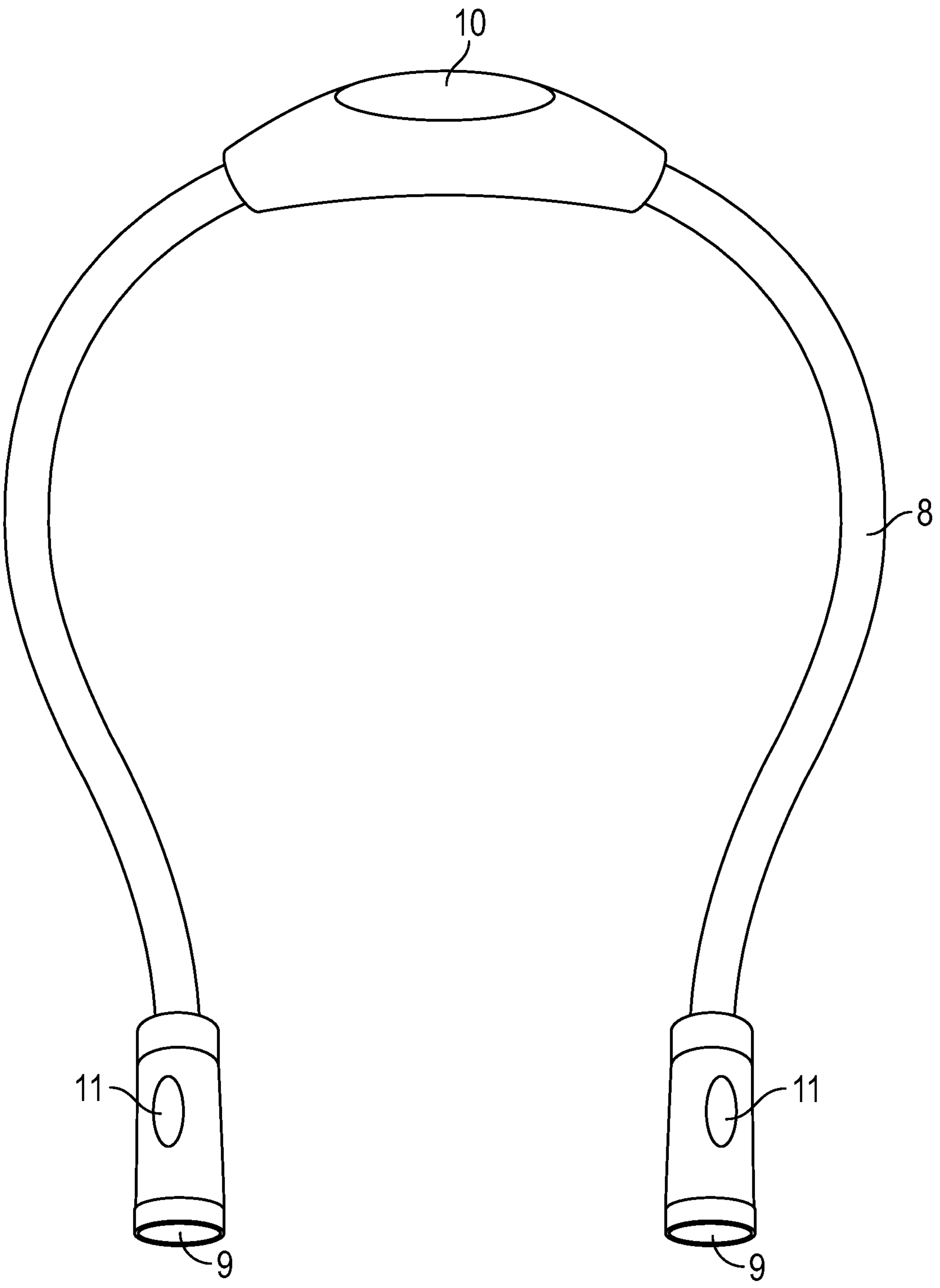
FIG. 5 shows an embodiment of a reading light for travel pillow of the disclosure.

FIG. 5 shows an embodiment of a reading light 8 for travel pillow of the disclosure. FIG. 5 shows reading light and band 8, USB charger 10, and further shows bulbs 9, and power buttons for the lights 11.

Figure 6:
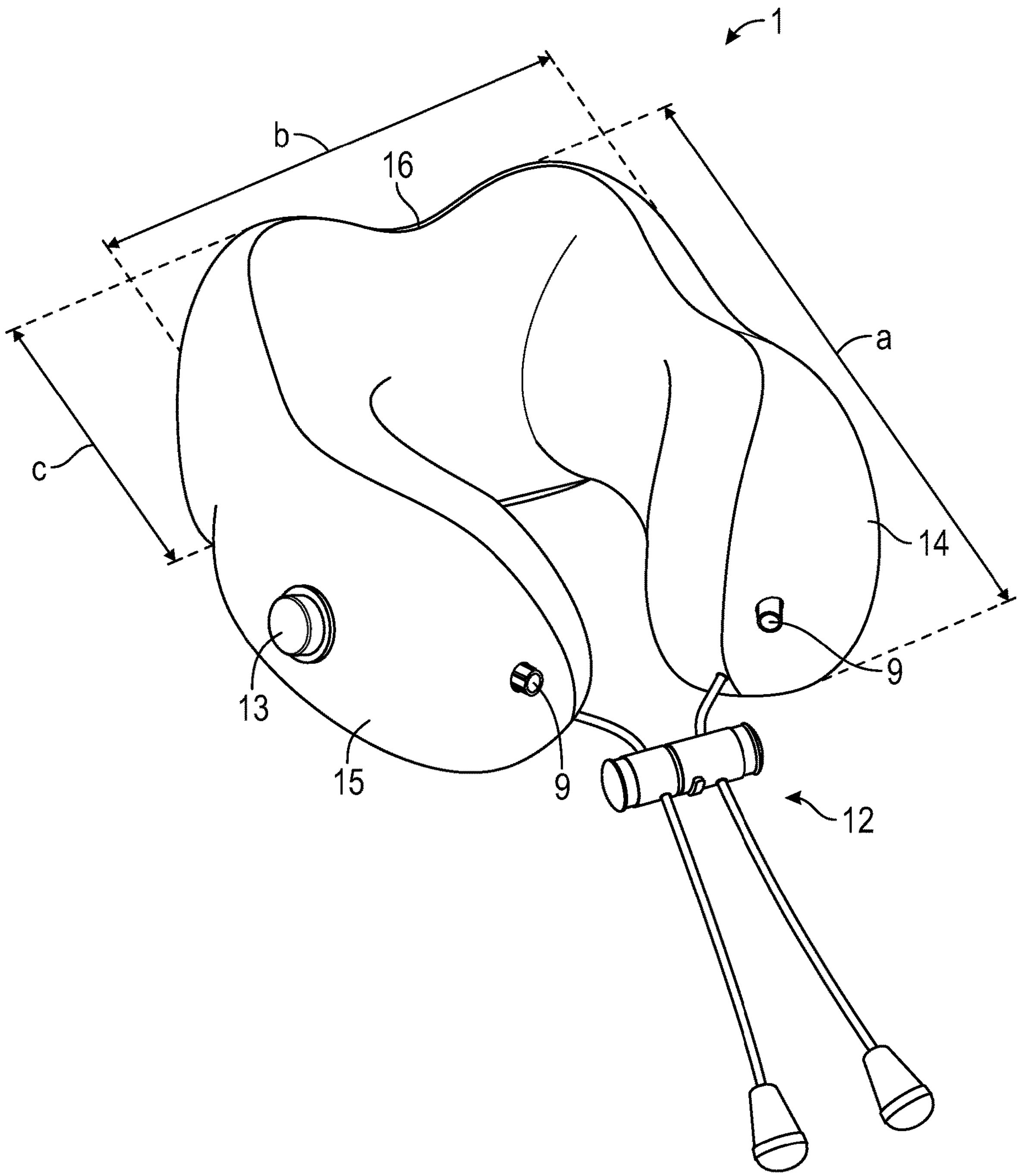
FIG. 6 shows another embodiment of a travel pillow of the disclosure.

FIG. 6 shows another embodiment of a travel pillow of the disclosure. FIG. 6 shows travel pillow 1, with arms 14 and 15, and back section 16. The travel pillow in FIG. 6 further shows embedded reading lights 9, drawstrings 12, and attached USB port and power button 13.

FIG. 6 shows the general construction and design of a travel pillow of the disclosure. Typically, the travel pillow will have a back section with two arms extending from the back. The back along with each arm each has an extension length and the back and arms each have a height. The arms serve to fit around a wearer's neck, and the back 16 will typically provide a rest for the wearer's head. As shown in FIG. 6, the arms and back may have thicknesses and heights which vary in order to comfortably and snugly fit around a user's neck and provide a rest for the user's head. Drawstrings may allow a wearer to fit the travel pillow snugly around the neck.

FIG. 6 further shows dimensions for a travel pillow of the disclosure, a, b, and c. The dimension, a, is the arm length of the travel pillow. Typically, both arms of the pillow will have approximately the same length. The dimension, b, is a back section length and the dimension, c, is a height.

In embodiments, an arm length (a) may range from about 8 inches to about 15 inches. A back section length (b) may range from about 4 inches to about 12 inches. The thickness of the back section may range from about 3 inches to about 12 inches and thickness of the arms may also range from about 3 inches to about 12 inches. The height (c) may range from about 4 to about 12 inches. The thickness being the width of each section. In preferred embodiments the back section and arms are integrally formed.

Materials for the travel pillow include memory foam (viscoelastic polyfoam), polyester, polyester beads, polyester puffballs, as well as polystyrene foams, feathers (down), and other fillers typically used in the pillow art.

The outer cover and blanket may comprise polyester, nylon, flannel, wool, cotton, fleece, microfleece, acrylic, vellux, and other soft materials typically used for pillows, blankets, and travel pillows.

The pouch may include a zipper, buttons, snaps, ties, hooks, overlapping edges, or other standard closure mechanisms known in the art. The pouch is preferably located on the cover on the back side (opposite from a wearer) of the back section. That is, the pouch and blanket are on the back side of the pillow more or less in the same plane as a wearer's back.

The blanket may be connected or attachable to the pillow with a zipper, buttons, snaps, ties, Velcro, or some other standard attachment mechanism. In embodiments, the blanket may be attached while in use but detachable for cleaning and washing.

Zippers as referred to herein generally include any zippers used in the pillow or garment arts and include metal zippers as well as plastic zippers. The blanket may attach to the cover at the bottom and fold up inside the cover to be contained by the pouch. In use, the blanket may fold out from the pouch while remaining attached at the bottom zipper or other attachment mechanism. The user may then insert their head through the opening or hole in the blanket and thus place the blanket on their body while using the pillow with the blanket remaining attached to the pillow.

EXAMPLE

In one specific example, the pillow cover and pillow, pouch, blanket, and reading light may be made by conventional methods known in the art. The pillow size may have a length of about 11 to 12 inches, a width of about 10 to 11 inches, and depth of about 6 to 7 inches. Pillow weight may be up to 1.5 pounds. The LED reading light may have a length of approximately 11 to 13 inches, and width of approximately 7-8 inches, and a weight of up to approximately 0.3 pounds.

While this disclosure includes specific examples, it will be apparent after an understanding of the disclosure of this application has been attained that various changes in form and details may be made in these examples without departing from the spirit and scope of the claims and their equivalents.

The invention claimed is:

1. A travel pillow comprising:

a cover comprising a back section and two arm sections each comprising a filler material; the back section comprising a pouch comprising a blanket attachable to the cover and configured to fit in the pouch; and a reading light assembly, comprising:

a right band, which is attached to a right arm section of the two arm sections;

a left band, which is attached to a left arm section of the two arm sections;

a right light, which is connected to an outer end of the right band; and a left light, which is connected to an outer end of the left band;

wherein the reading light assembly is substantially embedded inside the cover of the travel pillow, such that an outer portion of the right light protrudes from an outer surface of a front portion of the right arm section, and such that an outer portion of the left light protrudes from an outer surface of a front portion of the left arm section;

the arm sections each range in length from about 8 inches to about 15 inches and are approximately the same length;

the back section ranges in length from about 6 inches to about 12 inches;

the arm sections and back section have a thickness ranging from 3 inches to 12 inches;

the blanket comprises a semispherical, hemispherical, and/or oval opening sufficient for accommodating a user's head.

2. The travel pillow of claim 1, wherein the filler material comprises memory foam.

3. The travel pillow of claim 1, wherein the pouch further includes a closure mechanism.

4. The travel pillow of claim 3, wherein the closure mechanism includes a zipper, buttons, snaps, or a hook and loop fastener.

5. The travel pillow of claim 1, wherein the blanket is attachable to the cover with a zipper, buttons, snaps, or a hook and loop fastener;

such that the blanket is detachably attachable along lower portions of the back section, the left arm section, and the right arm section.

6. The travel pillow of claim 1, further comprising a USB port.

7. The travel pillow of claim 1, wherein the right light and the left light are each configurable to point in a downward direction when a user is seated with the travel pillow positioned on a neck of the user.

8. The travel pillow of claim 1, further comprising:

a single-piece band, which comprises the left band and the right band.

9. A travel pillow comprising:

a cover, comprising:

a back section;

a left arm section, connected to a left portion of the back section;

a right arm section, connected to a right portion of the back section; and a reading light assembly, comprising:

a right band, which is attached to the right arm section;

a left band, which is attached to the left arm section;

a right light, which is connected to an outer end of the right band; and a left light, which is connected to an outer end of the left band section;

wherein the reading light assembly is substantially embedded inside the cover of the travel pillow, such that an outer portion of the right light protrudes from an outer surface of a front portion of the right arm section, and such that an outer portion of the left light protrudes from an outer surface of a front portion of the left arm section; and wherein the right light and the left light are each configurable to point in a downward direction when a user is seated with the travel pillow positioned on a neck of the user.

10. The travel pillow of claim 9, further comprising:

a blanket, which is configured to be detachably attached along lower portions of the back section, the left arm section, and the right arm section.

11. The travel pillow of claim 10, wherein the blanket further comprises:

a hole, such that the hole permits access to a head of a user when the blanket is attached along the lower portions of the back section, the left arm section, and the right arm section.

12. The travel pillow of claim 10, wherein the rear section further comprises:

a pouch, which is configured to receive the blanket when the blanket is detached from the lower portions of the back section, the left arm section, and the right arm section.

13. A travel pillow comprising:

a cover, comprising:

a back section;

a left arm section, connected to a left portion of the back section;

a right arm section, connected to a right portion of the back section; and a reading light assembly, comprising:

a right band, which is attached to the right arm section;

a left band, which is attached to the left arm section;

a right light, which is connected to an outer end of the right band; and a left light, which is connected to an outer end of the left band section;

wherein the reading light assembly is substantially embedded inside the cover of the travel pillow, such that an outer portion of the right light protrudes from an outer surface of a front portion of the right arm section, such that an outer portion of the left light protrudes from an outer surface of a front portion of the left arm section, and such that the right band and the left band of the reading light assembly project through an inside of the cover from the front portion of the right arm section to the front portion of the left arm section; and wherein the right light and the left light are each configurable to point in a downward direction when a user is seated with the travel pillow positioned on a neck of the user.

* * * * *